United States Patent Office 2,743,131
Patented Apr. 24, 1956

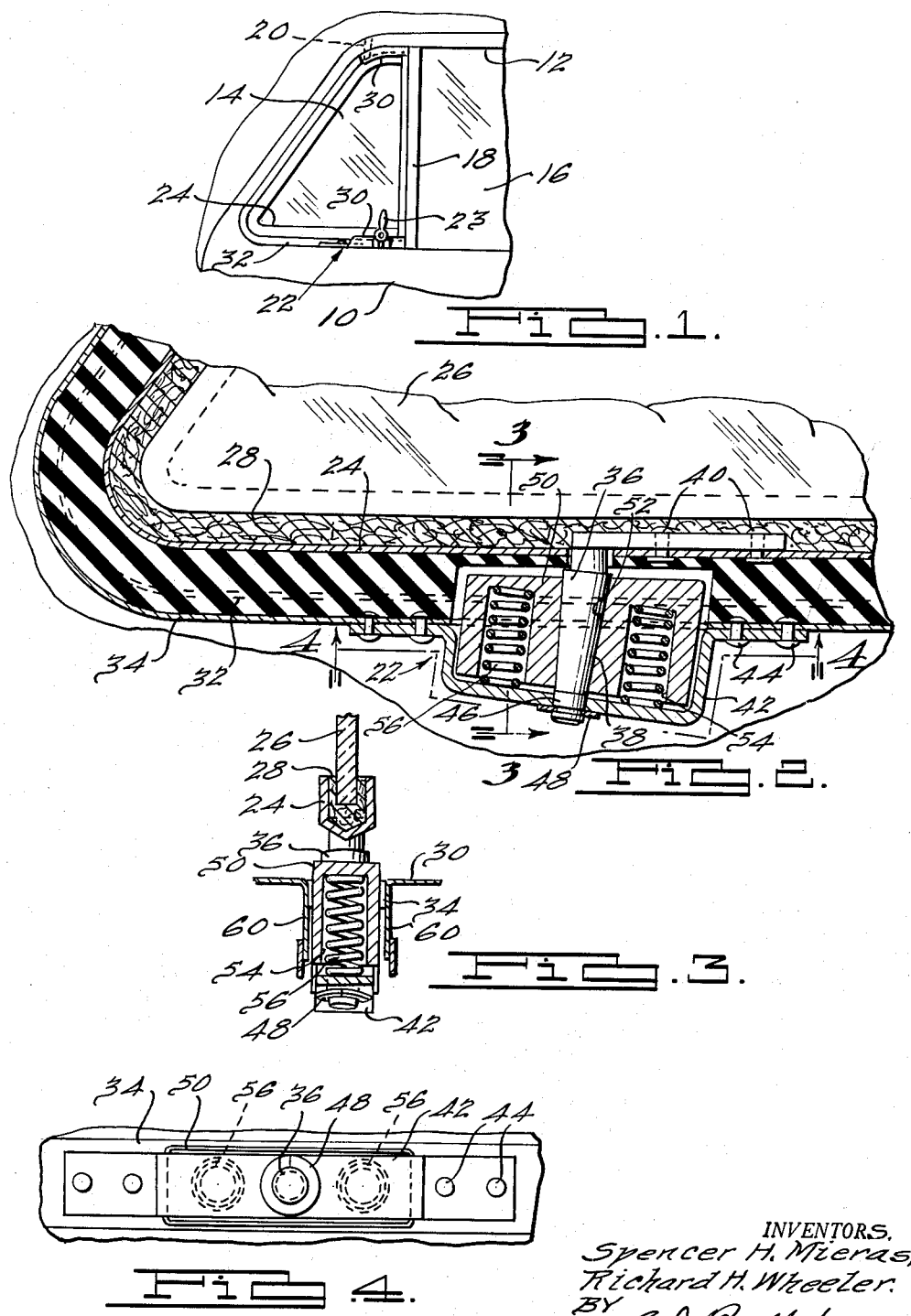

2,743,131

PIVOTAL MOUNTING FOR A VEHICLE VENTILATING WINDOW

Spencer H. Mieras and Richard H. Wheeler, Traverse City, Mich., assignors to F. L. Jacobs Co., Detroit, Mich., a corporation of Michigan Application June 29, 1953, Serial No. 364,857

4 Claims. (Cl. 296—44)

This invention relates to ventilating windows and has particular reference to a new and improved pivotal mounting for a ventilating window of the type used on automotive vehicles.

Ventilating windows of the type with which this invention is concerned are commonly employed in automotive vehicles to close the forward portion of the window opening in the front door of the vehicle and the pivotal mounting of this invention is adapted to provide for pivoting of a vent window about a generally upright axis and to frictionally retain the window in any adjusted position to which it may be moved.

A principal object of the invention, therefore, is to provide a new and improved pivotal mounting for a ventilating window.

Another object of the invention is to provide a pivotal mounting for a vent window of an automotive vehicle in which the width of the pivot is no wider than the space between the door panels within which the vertically slidable window is disposed.

Other and further objects of the invention will be apparent from the following description and claims and may be understood by reference to the accompanying drawings, of which there is one sheet, which by way of illustration show a preferred embodiment of the invention and what we now consider to be the best mode in which we have contemplated applying the principles of our invention. Other embodiments of the invention may be used without departing from the scope of the present invention as set forth in the appended claims.

In the drawings:

Fig. 1 is an elevational view of a vent window embodying our invention;

Fig. 2 is a fragmentary sectional view showing the pivotal mounting of the vent window;

Fig. 3 is a sectional view taken on line 3—3 of Fig. 2; and

Fig. 4 is a plan view taken on line 4—4 of Fig. 2.

In Fig. 1 there is illustrated a portion of the front door 10 of an automotive vehicle, the inner and outer door panels of which have inwardly turned edges providing a frame 12 defining a window opening therein, the forward portion of which opening is adapted to be closed by a pivoted ventilating window 14 and the rear portion of which is adapted to be closed by a vertically slidable window 16, a channel or post 18 separating the vertically slidable window 16 and the ventilating window 14 if desired.

The ventilating window 14 is adapted to be pivoted about a generally vertical axis by means of a pivotal connection 20 between the upper end of the window 14 and the frame 12, and a pivotal mounting 22 connecting the lower end of the window 14 to the frame 12.

The window 14 may be retained in its closed position by a latch 23, and may comprise a channel 24 adapted to receive a glass panel 26 with suitable resilient material 28 therebetween for providing a seal between the channel 24 and glass 26.

Resilient material, such as a rubber strip 32, is retained within a channel 34 suitably secured between the door panels at the forward portion of window opening therein. The resilient material 32 provides a seal between the window 14 and the frame 12 when the window 14 is in its closed position, and may include portions 30 overlapping the inner side of the channel 24 rearwardly of pivotal axis of window 14, and similar portions overlapping the outer side of the channel 24 forwardly of such axis.

A pivot pin 36 having a tapered end 38 is secured within channel 24 by means of rivets 40, or in any other suitable manner. The pin 36 projects through an opening in the bottom of the channel 24. A bracket 42 is secured to the under side of channel 34 by means such as rivets 44 and the lower end 46 of pin 36 projects through bracket 42 and is retained therein by a split ring or washer 48 located within a groove formed in the lower end 46 of the pin.

The bearing block 50 supported by bracket 42 has a tapered bore 52 therein into which the tapered portion 38 of the pin 36 projects. The bearing block 50 is slidable axially of pin 36 within the supporting bracket 42. The block 50 is provided with a pair of recesses 54 opening from the lower end thereof, the recesses being arranged one on either side of the pin 36 and in a common plane therewith. A compressed spring 56 is arranged in each of the recesses 54 and reacts against the supporting bracket 42 and the block 50 for urging the tapered bore 52 in the block into frictional engagement with the tapered portion 38 of the pin. The strip 32 may be suitably formed to accommodate the pin 36 and bearing block 50.

The frictional engagement of the tapered bore 52 with the pin 36 provides a frictional pivotal mounting for the ventilating window 14 by means of which the same may be frictionally retained in any adjusted position thereof within the frame 12. One of the principal advantages of the present construction is that the arrangement of the springs 56 on either side of pin 36 and in a common plane therewith reduces the width of the pivotal mounting 22 so that the same is no wider than the downwardly turned edges 60 of the door panels which define the space between the door panels within which the vertically slidable window 16 is disposed. It is always a problem to design automobile door window constructions in such manner as to avoid special construction or design of the door panels, which is costly. The pivotal mounting described herein occupies a minimum of space, requires no special design of the door panels or framework defining the window opening and does not take up space between the panels which is needed for the operating mechanism for the vertically slidable window.

While we have illustrated and described a preferred embodiment of our invention, it is understood that this is capable of modification and we therefore do not wish to be limited to the precise details set forth but desire to avail ourselves of such changes and alterations as fall within the purview of the following claims.

We claim:

1. In a ventilating window assembly including a window frame and a window panel pivotally supported within the frame on an up-and-down axis, a pivotal mounting for the panel comprising a pivot pin secured to the lower edge of the panel and having a tapered lower end projecting therefrom one said axis toward the frame, a bearing block movably supported by the frame and having a tapered socket in which the tapered end of said pin is journalled, said bearing block having a pair of recesses therein disposed one on each side of said socket and in a common plane therewith, and a spring in each recess reacting on said frame and bearing block to urge the tapered socket and pin into frictional engagement for frictionally retaining the panel in an adjusted position thereof within the frame.

2. In a ventilating window construction including a window frame, a window panel within the frame, a pivot pin secured to the panel and projecting toward the frame, a supporting bracket secured to the frame adjacent the pin, a bearing block movably supported by the bracket and having a tapered bore therein, said pivot pin having a tapered portion journalled in said tapered bore, and a pair of springs reacting on said bracket and bearing block for urging said tapered bore into engagement with the tapered portion of said pin for frictionally retaining said panel in an adjusted position within said frame, said springs being located one on each side of said pin and in a common plane therewith.

3. Ventilating window construction comprising a window panel, a pivot pin secured to the panel and projecting therefrom in the plane of the panel, a movable bearing block having a tapered bore therein, said pivot pin having a tapered portion journalled in said tapered bore, and a pair of springs reacting on said bearing block for urging said tapered bore into engagement with the tapered portion of said pin for frictionally retaining said panel in an adjusted position, said springs being disposed in recesses in said bearing block and being located one on each side of said pin and in a common plane therewith.

4. In a ventilating window construction for a vehicle door including inner and outer door panels defining a window opening and having downwardly turned edges at the bottom of the window opening defining a vertical channel between the door panels, a vertically slidable window panel slidable within said channel for closing a portion of said window opening and a pivoted ventilating window for closing the remainder of the window opening; a pivotal mounting for the ventilating window comprising a pivot pin secured to the ventilating window at its lower edge and having a tapered portion depending therefrom into said channel, a bearing block movably supported within the channel and having a tapered socket therein in which the tapered portion of said pin is journalled, a pair of recesses in said bearing block and a spring in each recess reacting on said bearing block to urge the tapered socket and pin into engagement for frictionally retaining the ventilating window in an adjusted position within the window opening, said recesses being disposed one on either side of said pin and in the plane of said channel whereby said pivotal mounting does not project laterally beyond the downwardly turned edges of the door panels defining said channel.

References Cited in the file of this patent

UNITED STATES PATENTS

| | | |
|---|---|---|
| 1,004,237 | Brandes | Sept. 26, 1911 |
| 2,115,036 | Morrison | Apr. 26, 1938 |
| 2,274,824 | Clark | Mar. 3, 1942 |
| 2,452,965 | Sulprizio | Nov. 2, 1948 |